United States Patent
Wishart

(10) Patent No.: US 11,691,627 B2
(45) Date of Patent: Jul. 4, 2023

(54) COUNTER-ROTATING ELECTRIC MOTOR SYSTEM FOR HIGH EFFICIENCY OPERATION OF A HYBRID OR ELECTRIC VEHICLE

(71) Applicant: CR FLIGHT, LLC, Carmichael, CA (US)

(72) Inventor: Randell J. Wishart, Reno, NV (US)

(73) Assignee: CR FLIGHT L.L.C., Carmichael, CA (US)

(*) Notice: Subject to any disclaimer, the term of this patent is extended or adjusted under 35 U.S.C. 154(b) by 266 days.

(21) Appl. No.: 16/925,821

(22) Filed: Jul. 10, 2020

(65) Prior Publication Data
US 2021/0001852 A1    Jan. 7, 2021

Related U.S. Application Data

(63) Continuation of application No. PCT/US2019/014593, filed on Jan. 22, 2019.
(Continued)

(51) Int. Cl.
*B60W 30/188* (2012.01)
*B60K 1/00* (2006.01)
(Continued)

(52) U.S. Cl.
CPC ............ *B60W 30/188* (2013.01); *B60K 1/00* (2013.01); *B60K 17/02* (2013.01); *B60K 17/16* (2013.01);
(Continued)

(58) Field of Classification Search
CPC .......... B60K 1/00; B60K 17/02; B60K 17/16; B60K 17/356; B60K 2001/001;
(Continued)

(56) References Cited

U.S. PATENT DOCUMENTS 2,431,255 A    11/1947  Jenkins
2,456,993 A    12/1948  Rambo
(Continued)

FOREIGN PATENT DOCUMENTS

CN      1771636 A    5/2006
CN    103659129 A    3/2014
(Continued)

OTHER PUBLICATIONS

Kawamura, Atsuo et al., "Anti-directional-twin-rotary motor drive for electric vehicles," Proceedings of 1994 IEEE Industry Applications Society Annual Meeting, vol. 1, 1994, pp. 453-459.
(Continued)

*Primary Examiner* — James A Shriver, II
*Assistant Examiner* — Michael T. Walsh
(74) *Attorney, Agent, or Firm* — O'Banion & Ritchey LLP; James M. Ritchey

(57) ABSTRACT

A vehicle that utilizes a counter-rotating electric motor to generate at least a portion of its propulsive force that includes the vehicle with front and rear wheels, the counter-rotating motor with two oppositely rotating components linked to two drive shafts that are coupled to the wheels in a common rotational direction, a component for reversible stopping the rotation of at least one rotating component while permitting the drive shafts to rotate, a power source linked to the motor, and a controller that controls both the speed of the vehicle and the reversible stopping component to switch between a first operational mode for slower vehicle speeds and a second operational mode for higher vehicle speeds, thereby increasing the overall electrical efficiency for operating the vehicle.

14 Claims, 4 Drawing Sheets

Related U.S. Application Data

(60) Provisional application No. 62/709,610, filed on Jan. 23, 2018.

(51) Int. Cl.
| | | |
|---|---|---|
| *B60K 17/02* | (2006.01) | |
| *B60K 17/16* | (2006.01) | |
| *B60K 17/356* | (2006.01) | |
| *B60L 15/20* | (2006.01) | |
| *B60W 10/08* | (2006.01) | |
| *B60W 10/14* | (2012.01) | |
| *B60W 30/182* | (2020.01) | |

(52) U.S. Cl.
CPC ........ *B60K 17/356* (2013.01); *B60L 15/2009* (2013.01); *B60W 10/08* (2013.01); *B60W 10/14* (2013.01); *B60W 30/182* (2013.01); *B60K 2001/001* (2013.01); *B60L 2220/50* (2013.01); *B60Y 2200/91* (2013.01); *B60Y 2200/92* (2013.01)

(58) Field of Classification Search
CPC . B60L 15/2009; B60L 2220/50; B60W 10/08; B60Y 2200/91
See application file for complete search history.

(56) References Cited

U.S. PATENT DOCUMENTS

| | | | |
|---|---|---|---|
| 2,462,182 A | 2/1949 | Guerdan | |
| 2,833,996 A | 5/1958 | Whicker | |
| 3,738,270 A | 6/1973 | Hargett | |
| 4,056,746 A | 11/1977 | Burtis | |
| 4,259,604 A | 3/1981 | Aoki | |
| 4,375,047 A * | 2/1983 | Nelson | G01N 11/14 73/54.35 |
| 4,645,963 A | 2/1987 | Plackner | |
| 4,938,700 A | 7/1990 | Campbell | |
| 5,067,932 A | 11/1991 | Edwards | |
| 5,089,734 A | 2/1992 | Bickraj | |
| 5,470,236 A | 11/1995 | Wissler | |
| 6,401,793 B1 * | 6/2002 | Martin | E05D 13/1261 49/200 |
| 6,433,451 B1 | 8/2002 | Cherciu | |
| 8,198,773 B2 | 6/2012 | Wishart | |
| 8,253,294 B1 | 8/2012 | Wishart | |
| 8,531,072 B2 | 9/2013 | Wishart | |
| 9,387,756 B1 | 7/2016 | Whiting | |
| 9,561,719 B2 | 2/2017 | Lo | |
| 10,116,187 B1 | 10/2018 | Wishart | |
| 2002/0190598 A1 | 12/2002 | Bartman | |
| 2006/0163963 A1 | 7/2006 | Flores, Jr. | |
| 2008/0185201 A1 * | 8/2008 | Bishop | F16D 3/12 180/165 |
| 2010/0113202 A1 | 5/2010 | Treichel | |
| 2010/0236849 A1 * | 9/2010 | Wishart | B60K 7/0007 310/115 |
| 2010/0327791 A1 * | 12/2010 | Casey | H02K 16/00 310/68 B |
| 2011/0177900 A1 | 7/2011 | Simon | |
| 2011/0259657 A1 * | 10/2011 | Fuechtner | B60K 7/0007 903/902 |
| 2012/0206004 A1 * | 8/2012 | Wishart | B62M 6/45 310/121 |
| 2013/0190961 A1 * | 7/2013 | Yuan | H02K 51/00 475/149 |
| 2015/0171774 A1 * | 6/2015 | Kim | B60L 15/2054 318/139 |
| 2016/0052382 A1 | 2/2016 | Clark | |
| 2016/0207522 A1 | 7/2016 | Pandit | |
| 2016/0244157 A1 | 8/2016 | Welsh | |

FOREIGN PATENT DOCUMENTS

| | | | |
|---|---|---|---|
| CN | 104332794 A | 2/2015 | |
| CN | 104505682 A | 4/2015 | |
| EP | 2578438 A1 * | 4/2013 | ............... B60K 1/00 |
| JP | 2006177375 A | 7/2006 | |
| WO | 2018106611 A1 | 6/2018 | |
| WO | 2019147587 | 8/2019 | |
| WO | 2019147588 | 8/2019 | |

OTHER PUBLICATIONS

Kawamura, Atsuo et al., "Analysis of anti-directional-twin-rotary motor drive characteristics for electric vehicles," IEEE Transactions on Industrial Electronics, vol. 44, No. 1, Feb. 1997 pp. 64-70.

Qiu, J. et al., "Counter-Rotating Permanent Magnet Brushless DC Motor for Underwater Propulsion", 2006 CES/IEEE 5th International Power Electronics and Motion Control Conference, 2006, pp. 1-5.

ISA/US, United States Patent and Trademark Office (USPTO), International Search Report and Written Opinion dated Feb. 12, 2018, related PCT international application No. PCT/US2017/064551, pp. 1-8, claims searched, pp. 9-14.

State Intellectual Property Office of People's Republic of China (SIPO), The First Office Action, dated Apr. 15, 2020, related Chinese patent application No. 201780072941.8, pp. 1-6, English-language translation, pp. 7-11, claims examined, pp. 12-17.

ISA/KR, Korean Intellectual Property Office (KIPO), International Search Report and Written Opinion dated May 1, 2019, related PCT international application No. PCT/US2019/014594, pp. 1-11, claims searched, pp. 12-13.

ISA/KR, Korean Intellectual Property Office (KIPO), International Search Report and Written Opinion dated May 8, 2019, related PCT international application No. PCT/US2019/014593, pp. 1-10, claims searched, pp. 11-17.

State Intellectual Property Office of People's Republic of China (SIPO), The Second Office Action, dated Jun. 16, 2020, related Chinese patent application No. 201780072941.8, pp. 1-3, English-language translation, pp. 4-8, claims examined, pp. 9-15.

* cited by examiner

COUNTER-ROTATING ELECTRIC MOTOR SYSTEM FOR HIGH EFFICIENCY OPERATION OF A HYBRID OR ELECTRIC VEHICLE

CROSS-REFERENCE TO RELATED APPLICATIONS

This application claims priority to, and is a 35 U.S.C. § 111(a) continuation of, PCT international application number PCT/US2019/014593 filed on Jan. 22, 2019, incorporated herein by reference in its entirety, which claims priority to, and the benefit of, U.S. provisional patent application Ser. No. 62/709,610 filed on Jan. 23, 2018, incorporated herein by reference in its entirety. Priority is claimed to each of the foregoing applications.

The above-referenced PCT international application was published as PCT International Publication No. WO 2019/147587 on Aug. 1, 2019, which publication is incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The subject invention pertains generally to a counter-rotating electric motor powered hybrid or electric vehicle that may be operated in either a counter-rotating drive mode (with both armature and stator rotating in opposite directions) or a standard/traditional motor mode (with stator fixed), thereby producing high efficiency operation of the vehicle at slower speeds while utilizing the counter-rotating drive mode. More specifically, the subject invention relates to a drive system for powering a hybrid or electric vehicle that contains a counter-rotating electric drive/motor in which an armature and a stator rotate in opposite directions at slower vehicle speeds via separate power output means that are associated with both the armature and stator. Both power output means may be coupled to one another and operated in the counter-rotating drive mode to propel the vehicle at slow speeds or one of the two output means is held stationary and operated in the standard motor mode for higher speeds, thus producing an increased efficiency profile (vehicle travel range versus vehicle speed). In the standard motor mode one efficiency range for the associated vehicle is achieved at higher speeds and in the counter-rotating drive mode another peak efficiency range for the vehicle is produced at slower speeds. Electromechanical control means are utilized to switch between the standard mode of operation and the counter-rotation mode of operation based, in part, on the vehicle's speed.

2. Background Discussion

A brush-containing motor is related in two generally theoretical papers from Japan. A device labeled as an "Anti-Directional-Twin Rotary Motor" is described that utilizes multiple brushes and slip rings of considerable size to power the outer rotor or as the authors state "the size of the slip ring is not negligible." The analysis of their brush-containing motor presents and relies on many theoretical estimations and adjustments to the very limited data that was recorded. It is of particular note that the stator resistance was adjusted so that the theoretical torque-speed curve might fit the measured curve. No comments or comparisons of any sort are made or suggested between their twin-rotor motor and a motor in which one of the rotors is stopped. Clearly, due to the difficulty of actually operating their multi-brush/slip ring motor, much of the presented/plotted data is not actual physical collected data for a twin-rotor motor but "estimated" data from "equivalent" situations. Also, it is plainly stated that the incorporation of the brush/slip ring containing means decreases efficiency by at least 20%. The papers are: "Anti-Directional-Twin-Rotary Motor Drive for Electric Vehicles" by Atsuo Kawamura, et al., page 453, 1994 IEEE (0-7803-1993-1/94 © 1994 IEEE) and "Analysis of Anti-Directional-Twin-Rotary Motor Drive Characteristics for Electric Vehicles" by Atsuo Kawamura, et al., IEEE Transactions on Industrial Electronics, Vol. 44, No. 1, February 1997 (0278-0046/97 © 1997 IEEE).

U.S. Pat. No. 8,531,072 discloses a counter-rotating motor with two rotating members that is converted into a traditional motor with only one rotating member by a manual operation carried out by a user. The examples include bicycles and tricycles in which an activation means is often a lever attached to the handlebars of the bicycle or tricycle.

BRIEF SUMMARY

An object of the technology described herein is to provide a counter-rotating motor containing vehicle that has at least two operational modes in which the operational mode determines the efficiency of the vehicle at a given velocity over a supporting surface.

Another object of the technology described herein is to furnish a counter-rotating motor containing vehicle that has at least two operational modes in which the counter-rotating motor switches, as desired, between operating as a traditional motor and a counter-rotating motor.

A further object of the technology described herein is to supply a counter-rotating motor containing vehicle that has at least two operational modes in which the counter-rotating motor switches, as desired, between operating as a traditional motor and a counter-rotating motor that includes a rotational buffering means to minimize possibly damaging torque created during operation of the vehicle.

Still another object of the technology described herein is to disclose a counter-rotating motor containing vehicle that has at least two operational modes in which the counter-rotating motor switches, as desired, between operating as a traditional motor at higher velocities over a supporting surface and a counter-rotating motor at lower velocities over the supporting surface.

Yet a further object of the technology described herein is to describe a counter-rotating motor containing vehicle that has at least three operational modes in which the counter-rotating motor switches, as desired, between operating as two possible traditional motor configurations and a counter-rotating motor configuration.

Disclosed is a vehicle and method of operation that utilizes an electric motor to generate at least a portion of its propulsive force. Comprising the subject invention is a vehicle having at least one front wheel and at least one rear wheel; a counter-rotating motor mounted to the vehicle, wherein the counter-rotating motor comprises; a first rotational member rotating in a first rotational direction about a central axis; a second rotational member rotating in a second rotational direction about the central axis; a first drive shaft attached to and extending from the first rotational member and rotating in the first rotational direction; a second drive shaft attached to and extending from the second rotational member and rotating in the second rotational direction; at least one set of electromagnets associated with one of the first and second rotational members; and electrical input means for powering and controlling the set of electromagnets; a first means for coupling the first drive shaft to the front wheel; a second means for coupling the second drive shaft to the rear wheel; means for matching the first drive shaft rotational direction with the second drive shaft rotational direction to produce a common rotational direction for the front and rear wheels; a first means for reversibly stopping the rotation of one of the first and second rotational members; a power source linked to said counter-rotating motor for providing electricity; and a controller in communication with the counter-rotating motor and the first stopping means that controls both the speed of the vehicle and the first stopping means to switch between a first operational mode in which both rotational members are rotating for slower vehicle speeds and a second operational mode in which one of the rotational members is stopped by the stopping means, thereby creating a traditional electric motor for higher vehicle speeds, thereby increasing the overall electrical efficiency for operating the vehicle, wherein the first stopping means is engaged by a method selected from the group consisting of manual activation and automatic activation.

Additionally, the subject invention includes an automatic activation of the first stopping means that results from programming in the controller that minimizes the usage of power during the operation of the vehicle.

The subject invention further comprising a rotational buffering means associated with at least one of said first and second drive shafts, wherein said rotational buffering means absorbs torsional stresses generated by acceleration and deceleration. Often the rotational buffering means comprises a resilient member or coiled spring that absorbs the torsional stresses.

Also, the subject invention includes a second stopping means that creates a third vehicle speed range when activated by stopping the drive shaft not stopped by the first stopping means and the first and second drive shaft coupling means contain different gear ratios.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

DETAILED DESCRIPTION

Figure 1:
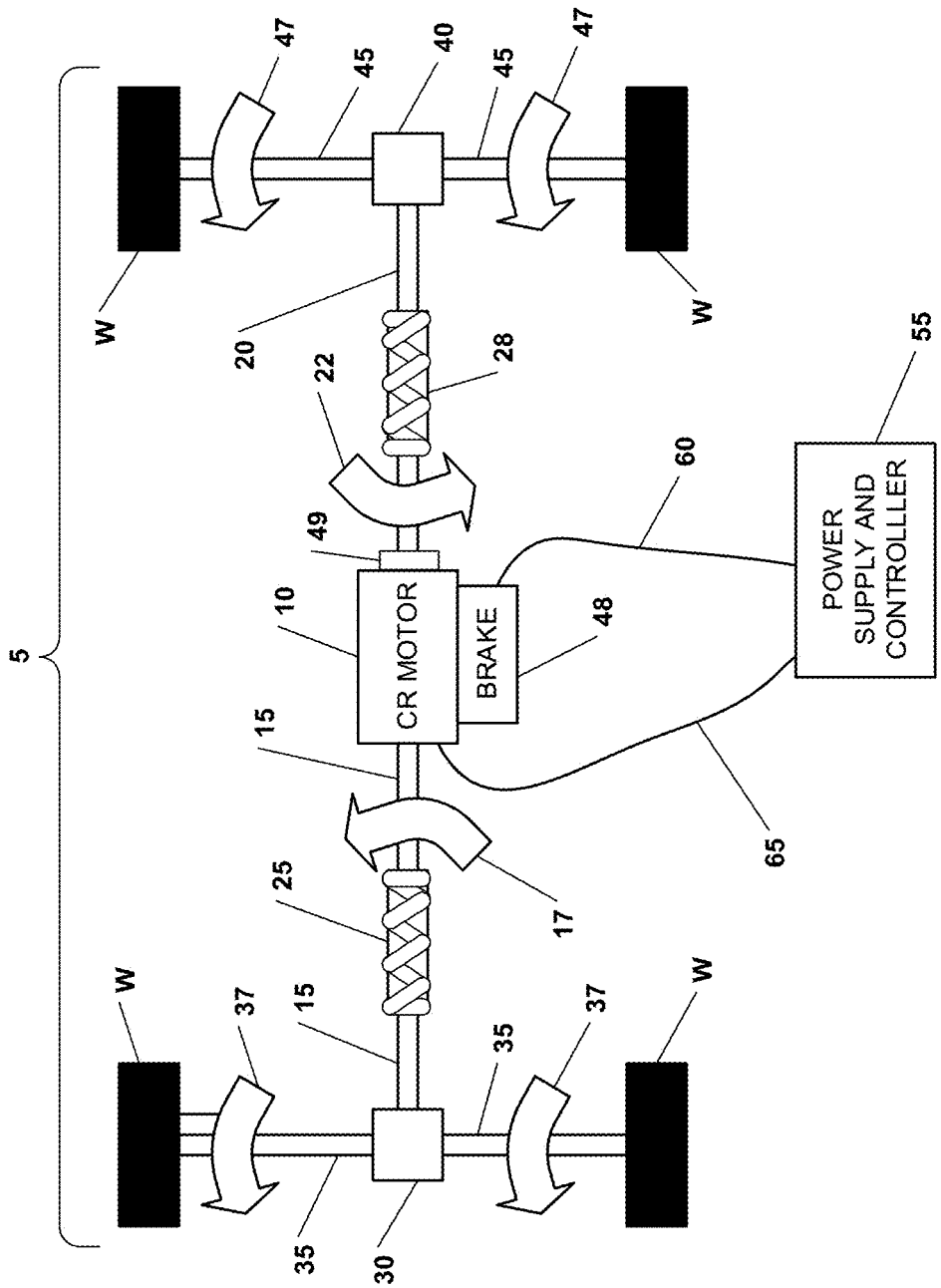
FIG. 1 shows an embodiment of the subject system that employs a counter-rotating motor and controller to power a vehicle in an efficient manner from slower to higher vehicle travel speeds.
Figure 3:
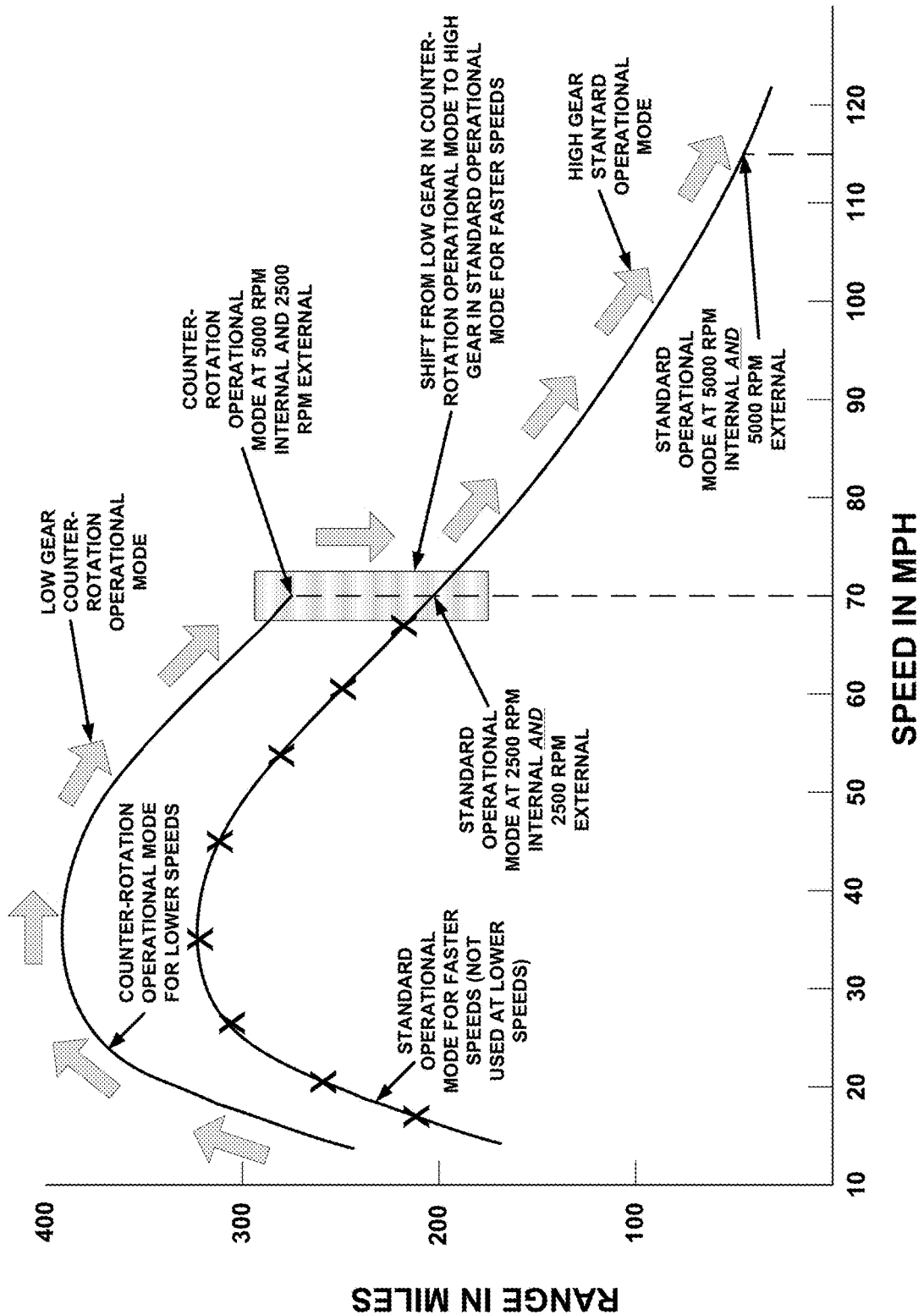
FIG. 3 shows an improved efficiency profile (vehicle range versus vehicle speed) produced by utilizing a counter-rotation operational mode at slower speeds (low gear) and then a standard operational mode at higher speeds (high gear).
Figure 4:
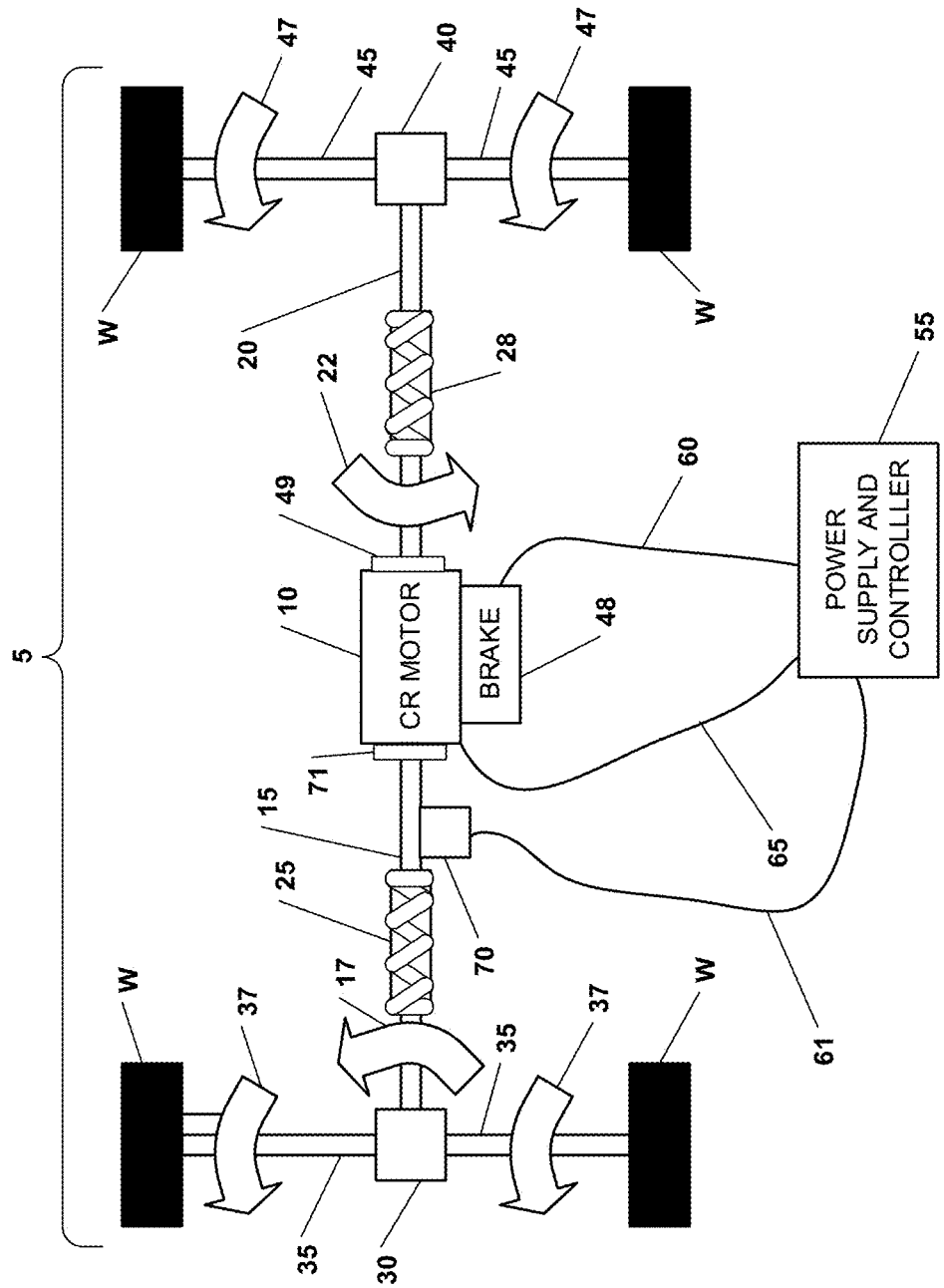
FIG. 4 shows an alternative embodiment of the subject invention in which a second halting means is provided and each of the two differentials has a different gearing ratio between the drive shafts and the wheels.

Referring more specifically to the drawings, for illustrative purposes the subject technology is embodied in the system generally shown in FIGS. 1, 3, and 4. It will be appreciated that the subject system may vary as to configuration and as to details of the components, and that the method may vary as to the specific steps and sequence, without departing from the basic concepts as disclosed herein.

Generally, the subject invention is a drive system for an associated hybrid or totally electric vehicle that utilizes a counter-rotating motor in two operational modes. The first operational mode is the counter-rotating state for the motor that is used at lower speeds and the second operational mode is the standard mode in which one of the two rotational members in the counter-rotating motor is fixed, thereby creating a traditional motor for use at higher speeds.

A counter-rotating motor has both the armature/rotor rotating in a first direction and the stator rotating in a second direction that is opposite to the spin of the armature. The subject invention may utilize DC or AC counter-rotating motors and ones that either contain brushes or are brushless. It is noted that since both the armature (first rotating member) and stator (second rotating member) are rotating, in opposite directions, a relatively sophisticated means is required to transmit electricity from an external power source (DC or AC) to the internal electromagnets. The electricity transfer means may be slip-ring type devices, electricity-conducting bearings (suitably insulated), or any equivalent and functioning structures. A mechanical power output means is secured to each rotating member and usually comprises a first drive shaft attached to the first rotating member (armature) and a second drive shaft attached to the second rotating member (stator). It must be remembered that when exiting the counter-rotating motor each drive shaft is rotating in opposite directions and, clearly, to be coupled together in a common rotational direction one must have its rotational direction reversed to match the other. Various means may accomplish this reversal, including, but not limited to, planetary gearing, appropriately configured belts and chains, suitable configured differential gearing, and equivalent means. Preferably, the subject invention employs a differential gear box that mates the rotational directions of the two drive shafts into a single rotational direction (to either propel the associated vehicle in a forward or reverse direction).

Thus, the overall general composition of the subject invention comprises: 1) a vehicle that utilizes electricity for at least a portion of its propulsive power input; 2) a counter-rotating motor mounted in the vehicle that converts the electrical input power into output mechanical power to drive the wheels of the vehicle; 3) an electrical power source/supply coupled to the counter-rotating motor; and 4) a controller coupled to the counter-rotating motor that is programmed for speed control and to determine the operational mode for the counter-rotating motor that yields the most efficient use of power.

Although the subject system may be adapted to vehicles with any number of front and rear wheels, the following description will, for exemplary purposes only, describe a four wheeled vehicle having two front wheels and two rear wheels in which all four wheels are powered. More specifically and in reference to FIG. 1, the subject device 5 comprises a counter-rotating (CR) motor 10 attached to the frame of the vehicle. Protruding from each end of the CR motor are drive shafts 15 and 20. The drive shafts 15 and 20 rotate in opposite directions 17 and 22. The CR motor is mounted to the vehicle so as to permit free rotation of each drive shaft 15 and 20, usually by suitable bearing assemblies. Preferably, within each drive shaft 15 and 20 is a rotational buffering means, often resilient members such as coiled springs 25 and 28. The purpose of the rotational buffering means is to cushion acceleration, deceleration, and shifting between a slow vehicle speed operational mode (counter-rotating with both drive shafts 15 and 20 rotating) and high vehicle speed operational mode (one shaft 15 or 20 stopped). For explanatory purposes only, and not by way of limitation, shaft 15 is attached to the armature of the CR motor and shaft 20 is attached to the stator of the CR motor (the reverse is also acceptable).

The first drive shaft 15, attached to the armature in this example, connects to the front differential gear box 30. From the differential gear box 30 the rotational power is transmitted to the front wheels W by axles 35 which cause the front wheels W to rotate in a common direction 37. The second drive shaft 20, attached to the stator in this example, connects to the rear differential gear box 40. Differential gear box 40 accomplishes two duties; 1) reverses the rotational direction of the drive shaft 20 and 2) transfers the reversed rotational power to the rear wheels W by axles 45 which now rotate 47 in the same direction 37 as the front axles 35.

The CR motor 10 is powered by a power supply that is usually a battery 56, fuel cell, or equivalent means. The controller and power supply 55 are grouped together as shown in FIG. 1, but may be separate units and mounted in different locations in the vehicle. The power supply and controller 55 are electrically linked to the CR motor by suitable wiring 60 and 65. One set of wires 65 powers the CR motor and produces a desired speed for the vehicle and a second set of wires reversibly activates the brake 48 that halts/stops the rotation of one of the rotational members, thereby converting the CR motor 10 into a traditional motor. For exemplary purposes only, and not by way of limitation, the brake 48 is shown as reversibly stopping/halting the motion of the drive shaft 20 (also, the reverse, reversibly stopping the armature associated drive shaft 15, is considered within the realm of this disclosure).

Drive shaft 20 couples with a standard freewheel 49 assembly that permits drive shaft 20 to rotate freely. Many traditional free-wheel assemblies 49 (and also 71 in FIG. 4, discussed below) are acceptable for use with the subject invention. One again, a free-wheel (or overrunning clutch) is a device that disengages the matched stator rotation and armature rotations when drive shaft 20 is slowed and halted, thus permitting the CR motor 10 to operate without the influence of the drive shaft 20.

Figure 2:
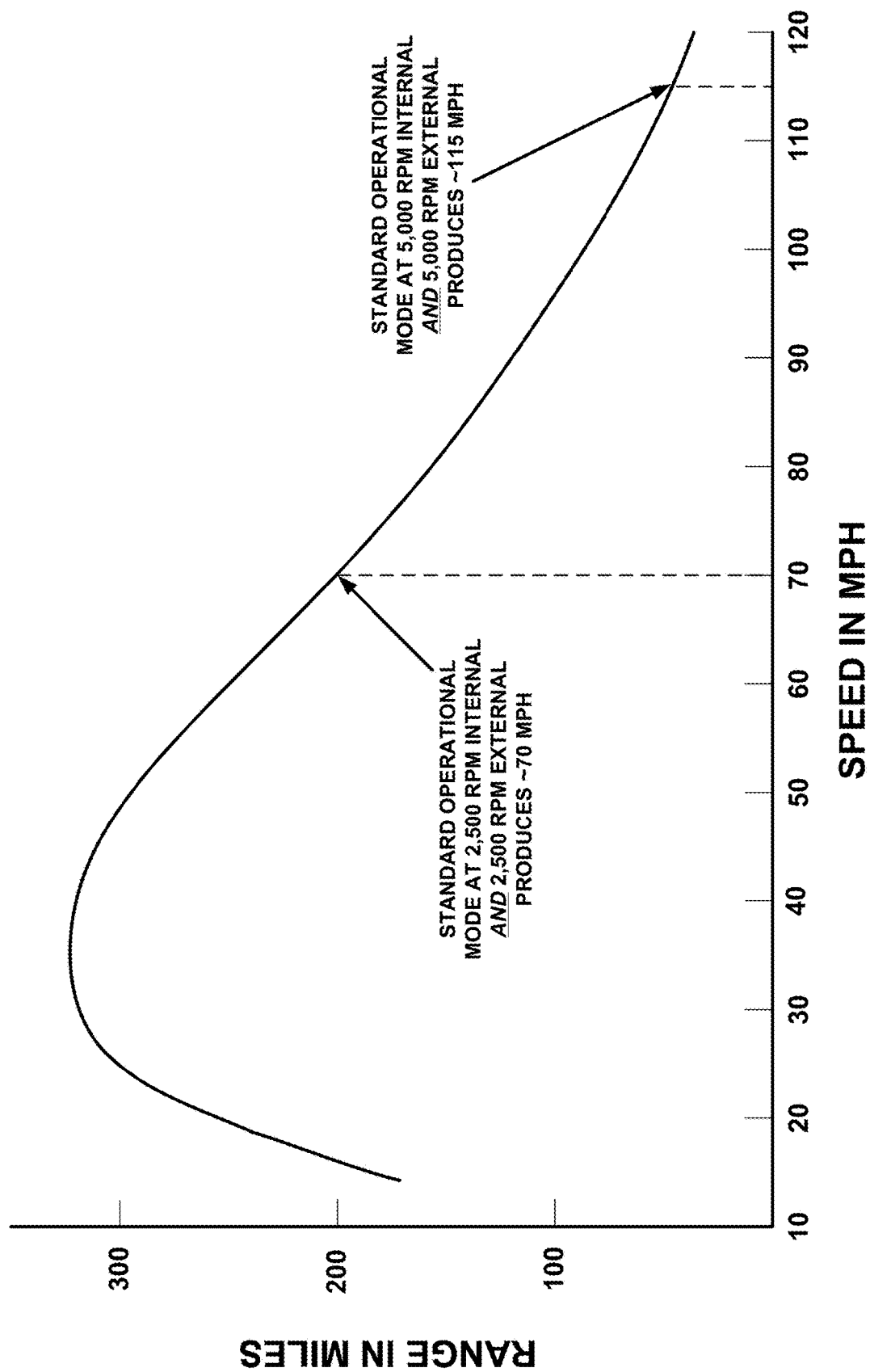
FIG. 2 is PRIOR ART that shows a typical efficiency profile (vehicle range versus vehicle speed) produced by utilizing a standard operational mode (traditional motor) for all speeds.

Besides controlling the speed of the vehicle, the controller may function in two different ways to reversibly halt the rotation of the stator. First, the controller may be manually operated as desired by a user of the vehicle by suitable means such as a button or lever that causes the CR motor to switch between the counter-rotating operational mode and the traditional operational mode with one of the rotational members reversibly halted. Second, and more importantly, the controller may be automatic in its actions with its operation dependent upon programming that determines the most efficient (vehicle range versus vehicle speed) mode of operation. To understand the most efficient mode of operation reference is initially made to the prior art shown in FIG. 2. FIG. 2 displays an exemplary driving efficiency curve with a vehicle containing a traditional electric motor (having only one rotational member). The vehicle range in miles is exemplary only (and clearly depends on the vehicle, motor, driving conditions, and the like) and is plotted on the abscissa/vertical axis, while the vehicle speed in miles per hour (MPH) is plotted on the ordinate/horizontal axis (again the actual MPH values are dependent upon numerous variables associated with the exact vehicle, motor, driving conditions, and the like). The performance or efficiency profile is plotted as having a peak at lower vehicle speeds and then the range dropping off as the vehicle speed increases. Each specific vehicle will have its own particular efficiency profile. FIG. 2 shows a major drawback in utilizing electric motors for vehicle: the range drastically decreases with vehicle speed so limited length trip are required and mandatory recharging of the battery is a frequent event.

FIG. 3 shows an efficiency profile for a vehicle using a CR motor (two rotational members) in place of a traditional motor (only one rotational member). The CR motor has a significantly different efficiency profile than a traditional motor. As seen in FIG. 3, the lower curve is the efficiency profile for a traditional motor and the upper curve is the efficiency profile for a subject CR motor that has the ability of switching between the CR operational mode (low gear) and the traditional/standard operational mode (high gear). It must be remembered that when a CR motor is operating at about an internal 5,000 RPM, for exemplary purposes only and not by way of limitation, each of the two associated drive shafts is rotating at only about 2,500 RPM. The CR motor is still operating at the higher RPM value for the rotational speed experienced by the stator relative to the armature, but the vehicle is moving at the speed generated by the 2,500 RPM drive shafts or in the relatively "slower" speed range (low gear). For the CR motor its efficiency is greater than the efficiency of the traditional motor at these slower vehicle speeds (operation in low gear for the vehicle). However, at higher vehicle speeds the traditional motor (operation in high gear for the vehicle) is utilized since the overall output RPM needed for higher speeds exceeds the ability of the CR configuration (e.g. for a 12,000 RPM drive shaft output the CR motor would need to have an internal/relative RPM value of 24,000 RPM). Thus, by automatically (or manually, if desired) switching between the CR operational mode at slower vehicle speeds (low gear) and the traditional operational mode at higher vehicle speeds (high gear) is very beneficial and allows a driver to increase the range traveled by the vehicle between battery charges. Although manual operation of the transition between the CR and traditional operational modes is useful, the automatic switching between the two is preferred for everyday usage to increase efficiency. The controlling programming includes the efficiency profiles for both the CR (low gear) and traditional (high gear) operational modes and other relevant information such as vehicle specifics, motor specifics, driver preferences, environmental conditions, and the like, and utilized appropriate decision-making algorithms in switching from one operational mode to the other. The proof of an improved efficiency at slower speeds with the CR operational mode (low gear) is shown below (Experimental Trials) with a prototype/model system in which the current (amps at constant voltage) dramatically drops when the system is switched to the CR operational mode at slower vehicle speeds (low gear). It is less productive for the CR operational mode to be employed at higher vehicle speeds (high gear) because the internal RPM values are approximately twice the external drive shaft RPM values and efficiency drops with internal RPM values that are too high.

FIG. 4 shows an alternate embodiment of the subject invention in which a second brake 70 and freewheel/clutch 71 is associated with drive shaft 15 to produce a third range of drive speeds. Control wiring/cables 61 activate the second brake 70 and extend between the power supply and controller 55 and the second brake 70.

Experimental Trials

A model prototype testing system was employed to prove that the subject CR motor system performs in a more efficient manner than a vehicle powered by simply a traditional motor. The CR motor-containing model had CR motor linked to the armature via a first drive shaft and to the stator via a second drive shaft. Rotational buffering springs were secured to the drive shafts. The first drive shaft connected with a first differential gear box to power the front wheels and the second drive shaft connected with a second differential gear box to both reverse the rotation of drive shaft and to power the rear wheels. For testing purposes, a removable weight was secured to the vehicle. The first drive shaft (armature associated) is connected to the differential gear box in a 1:1 ratio, but for testing concerning a traditional motor running at the same (½ internal RPM) value as the CR motor, a 2:1 gear ratio connection was provided in the model. The CR motor is converted into a traditional motor by reversibly applying a drive shaft brake. In the model case, the brake was a magnetic solenoid that, when activated by the test conductor, halts/stops the stator and rear wheel drive shaft. For production vehicles this brake may take various suitable forms that include, but are not limited to: magnetic or hydraulic means/solenoids; gears; and the like. The mode's magnetic solenoid brake was linked to the controller by suitable wiring.

The test model was linked by power/control wires and a support cable (all wrapped in a surrounding plastic covering) to a rotating support tower that permitted the model to travel a circular course during the tests. The power/control wires and support cable were connected to a test stand that had a battery and controller with a brake actuator switch, amp meter, and volt meter.

Tests were conducted to verify that the model car utilizing the CR operational mode (two rotating drive shafts) was more energy efficient than employing the traditional operational mode (one rotating drive shaft). The efficiency was determined in two ways: 1) % drop in input power (Table 1) and 2) % increase in battery life (Table 2).

Table 1 shows the data for operating the test model car to simulate an actual full sized vehicle. The data verifies that the subject invention saves input power in watts (amps× volts) during its operation in the CR motor operational mode over the power utilized in the traditional motor operational mode. The model car contains a CR motor that may be converted into a traditional motor by halting the rotation of the stator when desired. The operator merely flipped a switch on the control stand to activate a magnetic solenoid that brakes the motion of the stator associated drive shaft, but allows free rotation of the armature associated drive shaft, thereby converting the CR motor into a traditional motor, or vice versa upon releasing the stator drive shaft to freely rotate. Experiments were conducted under various conditions with recorded voltages and amps for each. It must be remembered that for the CR motor the internal RPM value, for the armature relative to the stator, is twice (2×) the RPM value for each of the external armature and stator drive shafts. For each motor type, six trial runs were conducted for each gearing configuration (either 1:1 or 2:1 gearing for the standard motor and 2:1 for the CR motor) and with and without an extra 5.5 lbs weight that was utilized to determine if added mass influenced the operation of the motors.

As show in Table 1, Trial Set 1, with no added weight to the car, compares the CR motor to the standard motor (CR motor with the brake halting the rotation of the stator) for calculated input power (watts) and given speeds (ft/sec). As can be seen, the CR motor is 38% more efficient (less input power required) with the armature directly linked in a 1:1 rear ratio.

Trial Set 2, with no added weight to the car, compares the CR motor to the standard motor in which the standard motor (stator halted on the CR motor) has its armature geared in a 2:1 ratio to simulate the ½ RPM output of the CR motor. In this situation, the CR motor used approximately 10% less input power to achieve the same vehicle velocity.

Trial Set 3, with 5.5 lbs added weight to the car, matches the CR motor to a standard motor in which the standard motor (stator halted on the CR motor) had its armature in a direct linkage or 1:1 ratio. The data shows that in this configuration the CR motor used approximately 39% less input power to achieve the same vehicle velocity.

Trial Set 4, with 5.5 lbs added weight to the car (like Trial Set 2, but with the added weight), matches the CR motor to a standard motor in which the standard motor (stator halted on the CR motor) had its armature in a geared linkage or 2:1 ratio. The data shows that in this configuration the CR motor used approximately 17% less input power to achieve the same vehicle velocity.

Clearly, in all of the tested configurations, the CR motor was more efficient that the standard motor in usage of input power. With addition of extra weight, the CR motor was even more efficient than the standard motor, especially when the armature is geared in a 2:1 ratio to mimic the RPM output of the CR configuration.

As shown in Table 2 for battery life data, Trial Set 5 (all of the battery life experiments had the 5.5 lbs of added weight) shows that the CR motor required 22.2 minutes for a fully charged battery (identical batteries were used in all tests and obtained from Ascent Battery Supply, LLC, Hartland, Wis. 53029, specifically made by Werker Batteries, WKA12-1.3F, 12V 1.3 Ah AGM Sealed Non-Spillable Battery) to drop from 13.05 volts to 8.99 volts. Trial Set 6 shows that the standard motor with armature in a geared linkage of 2:1 required 18.8 minutes for the fully charged battery to drop from 13.05 volts to 8.99 volts or approximately an 18% drop in battery life. Trial Set 7 shows that the standard motor with armature in a direct linkage of 1:1 required 11.6 minutes for the fully charged battery to drop from 13.05 volts to 8.99 volts or approximately a 91% drop in battery life. Thus, a lower draw on input power clearly increases the battery life in a significant way for the CR motor system.

An alternative embodiment of the subject invention is depicted in FIG. 4. FIG. 1 shows the CR motor mounted in a vehicle in which the gearing ratios to the two differentials 30 and 40 are approximately the same. When the two differentials 30 and 40 have approximately the same gearing ratios then two ranges of vehicle speeds can be created by: 1) allowing the stator and armature to rotate in the CR mode and 2) halting the stator (via brake 48 and associated freewheel/clutch 49) and driving the vehicle in a standard motor mode. However, as shown in FIG. 4, if the two differentials 30 and 40 are fitted with different gearing ratios and means are provided to halt the rotation of the armature (while still allowing the stator to rotate), usually a second halting brake 70 and associated freewheel/clutch 71 with associated control wiring/cables 61. Thus, three speed ranges are created with this configuration: 1) a first speed range when in the CR mode of operation; 2) a second speed range when the stator is stopped/halted and the vehicle is powered by the armature only via its associated differential; and 3) a third speed range when the armature is stopped/halted and the vehicle is powered by the stator only via its associated differential (with the two differential having different gear ratios).

Although not specifically described in detail in this disclosure, the subject system also drives motorcycles and other multi-wheeled or tread/track powered vehicles in an equivalent fashion and such devices are considered to be within the realm of this disclosure.

Disclosed embodiments of the subject invention include a CR electric motor that automatically switches between a high efficiency CR motor mode of operation at lower vehicle speeds to a less efficiency traditional motor mode of operation at higher vehicle speeds to generate at least a portion of its propulsive force, comprising: the vehicle having at least one front wheel and at least one rear wheel; a counter-rotating motor mounted to the vehicle, wherein the counter-rotating motor comprises; a first rotational member rotating in a first rotational direction about a central axis; a second rotational member rotating in a second rotational direction about the central axis; a first drive shaft attached to and extending from the first rotational member and rotating in the first rotational direction; a second drive shaft attached to and extending from the second rotational member and rotating in the second rotational direction; at least one set of electromagnets associated with one of the first and second rotational members; and electrical input means for powering and controlling the set of electromagnets; a first means for coupling the first drive shaft to the front wheel; a second means for coupling the second drive shaft to the rear wheel; means for matching the first drive shaft rotational direction with the second drive shaft rotational direction to produce a common rotational direction for the front and rear wheels; a first means for reversibly stopping the rotation of one of the first and second rotational members while permitting the first and second drive shafts to continue rotating; a power source linked to said counter-rotating motor for providing electricity; and a controller in communication with the counter-rotating motor and the first stopping means that controls both the speed of the vehicle and the first stopping means to switch between a first operational mode in which both rotational members are rotating for slower vehicle speeds and a second operational mode in which one of the rotational members is stopped by the stopping means, thereby creating a traditional electric motor for higher vehicle speeds, thereby increasing the overall electrical efficiency for operating the vehicle, wherein the first stopping means is engaged by a method selected from the group consisting of manual activation and automatic activation.

An additional embodiment of the subject invention includes the first means for reversibly stopping the rotation of one of the first and second rotational members while permitting the first and second drive shafts to continue rotating being a brake and a freewheel/clutch assembly.

In another embodiment of the subject invention the automatic activation of the first stopping means results from programming in the controller that minimizes the usage of power during the operation of the vehicle.

An additional embodiment of the subject invention further comprising a rotational buffering means associated with at least one of said first and second drive shafts, wherein said rotational buffering means absorbs torsional stresses generated by acceleration and deceleration.

Still another embodiment of the subject invention includes the rotational buffering means comprising a resilient member that absorbs the torsional stresses.

Yet a further embodiment of the subject invention includes the rotational buffering means that is a coiled spring member that absorbs said torsional stresses.

Yet an additional embodiment of the subject invention further comprises a second stopping means and associated second freewheel/clutch assembly that creates a third vehicle speed range when activated by stopping the drive shaft not stopped by the first stopping means and the first and second drive shaft coupling means contain different gear ratios.

A further embodiment of the subject invention comprises a vehicle that utilizes an electric motor to generate at least a portion of its propulsive force, comprising: the vehicle having two front wheels and two rear wheels; a counter-rotating motor mounted to the vehicle, wherein the counter-rotating motor comprises: a first rotational member rotating in a first rotational direction about a central axis; a second rotational member rotating in a second rotational direction about the central axis; a first drive shaft attached to and extending from the first rotational member and rotating in the first rotational direction; a second drive shaft attached to and extending from the second rotational member and rotating in the second rotational direction; at least one set of electromagnets associated with one of the first and second rotational members; electrical input means for powering and controlling the set of electromagnets; a first means for coupling the first drive shaft to the front wheels; a second means for coupling the second drive shaft to the rear wheels; means for matching the first drive shaft rotational direction with the second drive shaft rotational direction to produce a common rotational direction for the front and rear wheels; means for reversibly stopping the rotation of one of the first and second rotational members while permitting rotation of both the first and second drive shafts; a power source linked to the counter-rotating motor for providing electricity; and a programmable controller in communication with the counter-rotating motor and the stopping means that controls both the speed of the vehicle and the stopping means to switch between a first operational mode in which both rotational members are rotating for slower vehicle speeds and a second operational mode in which one of the rotational members is stopped by the stopping means, thereby creating a traditional electric motor for higher vehicle speeds, thereby increasing the overall electrical efficiency for operating the vehicle, wherein the programmable controller utilizes an improved efficiency profile that relates vehicle range versus vehicle speed and when switching from CR motor operation to traditional operation is appropriate for increased vehicle operational efficiency.

An additional embodiment of the subject invention in which the first means for reversibly stopping the rotation of one of the first and second rotational members while permitting the first and second drive shafts to continue rotating is a brake and a freewheel/clutch assembly.

Another embodiment of the subject invention is a vehicle according, wherein the automatic activation of the stopping means results from programming in the controller that minimizes the usage of power during the operation of the vehicle.

An additional embodiment of the subject invention comprises the first means for coupling the first drive shaft to the front wheels in the form of a differential gear box and the second means for coupling said second drive shaft to said rear wheels is a differential gear box oriented to reverse the rotation of the second shaft to produce a common rotational direction for both front and rear wheels.

Yet an additional embodiment of the subject invention is a vehicle a further comprising a rotational buffering means associated with at least one of the first and second drive shafts, wherein the rotational buffering means absorbs torsional stresses generated by acceleration and deceleration.

Still a further embodiment of the subject invention is a vehicle wherein the rotational buffering means comprises a resilient member that absorbs the torsional stresses.

Also, comprising an embodiment of the subject invention is a vehicle wherein the rotational buffering means comprises a coiled spring member that absorbs the torsional stresses.

Still yet an additional embodiment of the subject invention is a vehicle further comprising a second stopping means and associated freewheel/clutch assembly that creates a third vehicle speed range when activated by stopping the drive shaft not stopped by the first stopping means and the first and second drive shaft coupling means contain different gear ratios.

Another embodiment of the subject invention is a method for providing propulsive force to a vehicle having two front wheels and two rear wheels, wherein the method steps comprise: providing a counter-rotating motor mounted to the vehicle, wherein the counter-rotating motor comprises: a first rotational member rotating in a first rotational direction about a central axis; a second rotational member rotating in a second rotational direction about the central axis; a first drive shaft attached to and extending from the first rotational member and rotating in the first rotational direction; a second drive shaft attached to and extending from the second rotational member and rotating in the second rotational direction; at least one set of electromagnets associated with one of the first and second rotational members; and electrical input means for powering and controlling said set of electromagnets; incorporating into the vehicle a first means for coupling the first drive shaft to the front wheels; incorporating into the vehicle a second means for coupling the second drive shaft to the rear wheels; including in the vehicle means for matching the first drive shaft rotational direction with the second drive shaft rotational direction to produce a common rotational direction for the front and rear wheels; supplying in the vehicle a first means for reversibly stopping the rotation of one of the first and second rotational members while permitting both drive shafts to rotate; providing in the vehicle a power source linked to the counter-rotating motor for providing electricity; and attaching into the vehicle a controller in communication with the counter-rotating motor and the stopping means that controls both the speed of the vehicle and the stopping means to switch between a first operational mode in which both rotational members are rotating for slower vehicle speeds and a second operational mode in which one of said rotational members is stopped by the stopping means, thereby creating a traditional electric motor for higher vehicle speeds, thereby increasing the overall electrical efficiency for operating the vehicle, wherein the stopping means is engaged by a method selected from the group consisting of manual activation and automatic activation.

An additional embodiment of the subject invention is a method that includes in the first means for reversibly stopping the rotation of one of the first and second rotational members while permitting the first and second drive shafts to continue rotating a brake and a freewheel/clutch assembly.

Still another embodiment of the subject invention is a method for providing propulsive force to a vehicle according, wherein the automatic activation of the stopping means results from programming in the controller that minimizes the usage of power during the operation of the vehicle.

Yet a further embodiment of the subject invention is a method for providing propulsive force to a vehicle, wherein the first means for coupling the first drive shaft to the front wheels comprises a differential gear box and the second means for coupling the second drive shaft to the rear wheels comprises a differential gear box oriented to reverse the rotation of the second shaft to produce a common rotational direction for both front and rear wheels.

Still yet another embodiment of the subject invention is a method for providing propulsive force to a vehicle, further comprising a rotational buffering means associated with at least one of the first and second drive shafts, wherein the rotational buffering means absorbs torsional stresses generated by acceleration and deceleration.

Yet a further embodiment of the subject invention is a method for providing propulsive force to a vehicle, wherein the rotational buffering means comprises a resilient member that absorbs the torsional stresses and is often a coiled spring member.

An additional embodiment of the subject invention is a method, further comprising supplying a second stopping means with associated freewheel/clutch assembly that creates a third vehicle speed range when activated by stopping the drive shaft not stopped by the first stopping means and the first and second drive shaft coupling means contain different gear ratios.

A further additional embodiment includes a programmable controller that utilizes an improved efficiency profile that relates vehicle range versus vehicle speed and when switching from CR motor operation to traditional operation is appropriate for increased vehicle operational efficiency.

From the description herein, it will be appreciated that the present disclosure encompasses multiple additional embodiments which include, but are not limited to, the following:

1. A vehicle that utilizes a counter-rotating (CR) electric motor that automatically switches between a high efficiency CR motor mode of operation at lower vehicle speeds to a less efficiency traditional motor mode of operation at higher vehicle speeds to generate at least a portion of its propulsive force, comprising: (a) the vehicle having at least one front wheel and at least one rear wheel; (b) a CR motor mounted to the vehicle, wherein said CR motor comprises: (i) a first rotational member rotating in a first rotational direction about a central axis; (ii) a second rotational member rotating in a second rotational direction about said central axis; (iii) a first drive shaft attached to and extending from said first rotational member and rotating in said first rotational direction; (iv) a second drive shaft attached to and extending from said second rotational member and rotating in said second rotational direction; (v) at least one set of electromagnets associated with one of said first and second rotational members; and (vi) electrical input means for powering and controlling said set of electromagnets; (c) a first means for coupling said first drive shaft to said front wheel; (d) a second means for coupling said second drive shaft to said rear wheel; (e) means for matching said first drive shaft rotational direction with said second drive shaft rotational direction to produce a common rotational direction for said front and rear wheels; (f) a first means for reversibly stopping the rotation of one of said first and second rotational members while permitting said first and second drive shafts to rotate; (g) a power source linked to said CR motor for providing electricity; and (h) a programmable controller in communication with said CR motor and said first reversible stopping means that controls both the speed of the vehicle and said first stopping means to switch between a first operational mode in which both rotational members are rotating for slower vehicle speeds and a second operational mode in which one of said rotational members is stopped by said stopping means, thereby creating a traditional electric motor for higher vehicle speeds, thereby increasing the overall electrical efficiency for operating the vehicle.

2. A vehicle according to any preceding or following embodiment, wherein said first means for reversibly stopping the rotation of one of the first and second rotational members while permitting said first and second drive shafts to continue rotating is a brake and a freewheel/clutch assembly.

3. A vehicle according to any preceding or following embodiment, wherein said automatic activation of said first stopping means results from programming in said controller that minimizes the usage of power during the operation of the vehicle.

4. A vehicle according to any preceding or following embodiment, further comprising a rotational buffering means associated with at least one of said first and second drive shafts, wherein said rotational buffering means absorbs torsional stresses generated by acceleration and deceleration.

5. A vehicle according to any preceding or following embodiment, wherein said rotational buffering means comprises a resilient member that absorbs said torsional stresses.

6. A vehicle according to any preceding or following embodiment, wherein said rotational buffering means comprises a coiled spring member that absorbs said torsional stresses.

7. A vehicle according to any preceding or following embodiment, further comprising a second stopping means that creates a third vehicle speed range when activated by reversibly stopping the rotation of said first and second rotational members not reversibly stopped by said first stopping means and said first and second drive shaft coupling means contain different gear ratios, wherein said second reversibly stopping means permits said first and second drive shafts to continue rotating and is a brake and a freewheel/clutch assembly.

8. A vehicle that utilizes a CR electric motor that automatically switches between a high efficiency CR motor mode of operation at lower vehicle speeds to a less efficiency traditional motor mode of operation at higher vehicle speeds to generate at least a portion of its propulsive force, comprising: (a) the vehicle having two front wheels and two rear wheels; (b) a CR motor mounted to the vehicle, wherein said CR motor comprises: (i) a first rotational member rotating in a first rotational direction about a central axis; (ii) a second rotational member rotating in a second rotational direction about said central axis; (iii) a first drive shaft attached to and extending from said first rotational member and rotating in said first rotational direction; (iv) a second drive shaft attached to and extending from said second rotational member and rotating in said second rotational direction; (v) at least one set of electromagnets associated with one of said first and second rotational members; and (vi) electrical input means for powering and controlling said set of electromagnets; (c) a first means for coupling said first drive shaft to said front wheels; (d) a second means for coupling said second drive shaft to said rear wheels; (e) means for matching said first drive shaft rotational direction with said second drive shaft rotational direction to produce a common rotational direction for said front and rear wheels; (f) means for reversibly stopping the rotation of one of said first and second rotational members while permitting said first and second drive shafts to rotate wherein said first means for reversibly stopping the rotation of one of the first and second rotational members while permitting said first and second drive shafts to continue rotating is a brake and a freewheel/clutch assembly; (g) a power source linked to said CR motor for providing electricity; and (h) a programmable controller in communication with said CR motor and said stopping means that controls both the speed of the vehicle and said stopping means to switch between a first operational mode in which both rotational members are rotating for slower vehicle speeds and a second operational mode in which one of said rotational members is stopped by said stopping means, thereby creating a traditional electric motor for higher vehicle speeds, thereby increasing the overall electrical efficiency for operating the vehicle, wherein said programmable controller utilizes an improved efficiency profile that relates vehicle range versus vehicle speed and when switching from CR motor operation to traditional operation is appropriate for increased vehicle operational efficiency.

9. A vehicle according to any preceding or following embodiment, wherein said automatic activation of said stopping means results from programming in said controller that minimizes the usage of power during the operation of the vehicle.

10. A vehicle according to any preceding or following embodiment, wherein said first means for coupling said first drive shaft to said front wheels comprises a differential gear box and said second means for coupling said second drive shaft to said rear wheels comprises a differential gear box oriented to reverse the rotation of said second shaft to produce a common rotational direction for both front and rear wheels.

11. A vehicle according to any preceding or following embodiment, further comprising a rotational buffering means associated with at least one of said first and second drive shafts, wherein said rotational buffering means absorbs torsional stresses generated by acceleration and deceleration.

12. A vehicle according to any preceding or following embodiment, wherein said rotational buffering means comprises a resilient member that absorbs said torsional stresses.

13. A vehicle according to any preceding or following embodiment, wherein said rotational buffering means comprises a coiled spring member that absorbs said torsional stresses.

14. A vehicle according to any preceding or following embodiment, further comprising a second stopping means that creates a third vehicle speed range when activated by reversibly stopping the rotation of said first and second rotational members not reversibly stopped by said first stopping means and said first and second drive shaft coupling means contain different gear ratios, wherein said second reversibly stopping means permits said first and second drive shafts to continue rotating and is a brake and a freewheel/clutch assembly.

15. A method for providing propulsive force to a vehicle having two front wheels and two rear wheels that utilizes a CR electric motor that automatically switches between a high efficiency CR motor mode of operation at lower vehicle speeds to a less efficiency traditional motor mode of operation at higher vehicle speeds, wherein steps comprise: (a) providing the CR motor mounted to the vehicle, wherein said CR motor comprises: (i) a first rotational member rotating in a first rotational direction about a central axis; (ii) a second rotational member rotating in a second rotational direction about said central axis; (iii) a first drive shaft attached to and extending from said first rotational member and rotating in said first rotational direction; (iv) a second drive shaft attached to and extending from said second rotational member and rotating in said second rotational direction; (v) at least one set of electromagnets associated with one of said first and second rotational members; and (vi) electrical input means for powering and controlling said set of electromagnets; (b) incorporating into the vehicle a first means for coupling said first drive shaft to said front wheels; (c) incorporating into the vehicle a second means for coupling said second drive shaft to said rear wheels; (d) including in the vehicle means for matching said first drive shaft rotational direction with said second drive shaft rotational direction to produce a common rotational direction for said front and rear wheels; (e) supplying in the vehicle a first means for reversibly stopping the rotation of one of said first and second rotational members while permitting said first and second drive shafts to rotate wherein said first means for reversibly stopping the rotation of one of the first and second rotational members while permitting said first and second drive shafts to continue rotating is a brake and a freewheel/clutch assembly; (f) providing in the vehicle a power source linked to said counter-rotating motor for providing electricity; and (g) attaching into the vehicle a programmable controller in communication with said counter-rotating motor and said stopping means that controls both the speed of the vehicle and said stopping means to switch between a first operational mode in which both rotational members are rotating for slower vehicle speeds and a second operational mode in which one of said rotational members is stopped by said stopping means, thereby creating a traditional electric motor for higher vehicle speeds, thereby increasing the overall electrical efficiency for operating the vehicle, wherein said stopping means is engaged by a method selected from the group consisting of manual activation and automatic activation.

16. A method for providing propulsive force to a vehicle according to any preceding or following embodiment, wherein said automatic activation of said stopping means results from programming in said controller that minimizes the usage of power during the operation of the vehicle.

17. A method for providing propulsive force to a vehicle according to any preceding or following embodiment, wherein said first means for coupling said first drive shaft to said front wheels comprises a differential gear box and said second means for coupling said second drive shaft to said rear wheels comprises a differential gear box oriented to reverse the rotation of said second shaft to produce a common rotational direction for both front and rear wheels.

18. A method for providing propulsive force to a vehicle according to any preceding or following embodiment, further comprising a rotational buffering means associated with at least one of said first and second drive shafts, wherein said rotational buffering means absorbs torsional stresses generated by acceleration and deceleration.

19. A method according to any preceding or following embodiment, further comprising supplying a second stopping means that creates a third vehicle speed range when activated by reversibly stopping the rotation of said first and second rotational members not reversibly stopped by said first stopping means and said first and second drive shaft coupling means contain different gear ratios, wherein said second reversibly stopping means permits said first and second drive shafts to continue rotating and is a brake and a freewheel/clutch assembly.

20. A method according to any preceding or following embodiment, wherein said programmable controller utilizes an improved efficiency profile that relates vehicle range versus vehicle speed and when switching from CR motor operation to traditional operation is appropriate for increased vehicle operational efficiency.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

Input Electrical Power Efficiency Model Car Test

| Trial Set | Motor Type Tested (each one is an average of six trial runs) | Additional Weight of 5.5 lbs, if added | Gearing from Internal Rotation to External Drive Shaft(s) | Amps | Volts | $P_{in}$ (watts) | Improvement of CR Motor Over Standard Motor in Input Power (watts) at the same speed | Time to Complete one Lap On Test Course (secs) |
|---|---|---|---|---|---|---|---|---|
| 1 | Standard (stator stopped) | — | 1 to 1 (direct linkage to armature) | 2.04 | 12.05 | 24.6 | 38% | 4.9 |
|   | CR | — | 2 to 1 | 1.20 | 12.7 | 15.2 |   | 4.9 |

TABLE 1-continued

Input Electrical Power Efficiency Model Car Test

| Trial Set | Motor Type Tested (each one is an average of six trial runs) | Additional Weight of 5.5 lbs, if added | Gearing from Internal Rotation to External Drive Shaft(s) | Amps | Volts | $P_{in}$ (watts) | Improvement of CR Motor Over Standard Motor in Input Power (watts) at the same speed | Time to Complete one Lap On Test Course (secs) |
|---|---|---|---|---|---|---|---|---|
| 2 | Standard (stator stopped) | – | 2 to 1 (armature geared) | 1.33 | 12.7 | 16.9 | 10% | 5.3 |
|   | CR | – | 2 to 1 | 1.20 | 12.7 | 15.2 |  | 5.3 |
| 3 | Standard (stator stopped) | + | 1 to 1 (direct linkage to armature) | 2.67 | 12.05 | 32.2 | 39% | 5.0 |
|   | CR | + | 2 to 1 | 1.54 | 12.7 | 19.6 |  | 5.0 |
| 4 | Standard (stator stopped) | + | 2 to 1 (armature geared) | 1.72 | 12.7 |  | 17% | 4.7 |
|   | CR | + | 2 to 1 | 1.51 | 11.9 | 18.0 |  | 4.7 |

TABLE 2

Battery Life for Model Car Test

| Trial Set | Motor Type Tested (each one is an average of six trial runs) | Additional Weight of 5.5 lbs, is added to all | Gearing from Internal Rotation to External Drive Shaft(s) | Volts-Start | Volts-Stop | Time for Drop in Volts (mins) | Speed (ft/sec) | CR Over STD Motor in Battery Life |
|---|---|---|---|---|---|---|---|---|
| 5 | CR | + | 2 to 1 | 13.05 | 8.99 | 22.2 | 5.2 | na |
| 6 | Standard (stator stopped) | + | 2 to 1 (armature geared) | 13.05 | 8.99 | 18.8 | 5.2 | 18% |
| 7 | Standard (stator stopped) | + | 1 to 1 (direct linkage to armature) | 13.05 | 8.99 | 11.6 | 5.2 | 91% |

What is claimed is:

1. A vehicle that utilizes a counter-rotating (CR) electric motor that automatically switches between a high efficiency CR motor mode of operation at lower vehicle speeds to a less efficiency traditional motor mode of operation at higher vehicle speeds to generate at least a portion of its propulsive force, comprising:
   (a) the vehicle having at least one front wheel and at least one rear wheel;
   (b) a CR motor mounted to the vehicle, wherein said CR motor comprises:
     (i) a first rotational member rotating in a first rotational direction about a central axis;
     (ii) a second rotational member rotating in a second rotational direction about said central axis;
     (iii) a first drive shaft attached to and extending from said first rotational member and rotating in said first rotational direction;
     (iv) a second drive shaft attached to and extending from said second rotational member and rotating in said second rotational direction;
     (v) at least one set of electromagnets associated with one of said first and second rotational members; and
     (vi) electrical input means for powering and controlling said set of electromagnets;
   (c) a first means for coupling said first drive shaft to said front wheel;
   (d) a second means for coupling said second drive shaft to said rear wheel;
   (e) means for matching said first drive shaft rotational direction with said second drive shaft rotational direction to produce a common rotational direction for said front and rear wheels;
   (f) a first means for reversibly stopping the rotation of one of said first and second rotational members while permitting said first and second drive shafts to rotate;
   (g) a power source linked to said CR motor for providing electricity; and
   (h) a programmable controller in communication with said CR motor and said first reversible stopping means that controls both the speed of the vehicle and said first stopping means to switch between a first operational mode in which both rotational members are rotating for slower vehicle speeds and a second operational mode in which one of said rotational members is stopped by said stopping means, thereby creating a traditional electric motor for higher vehicle speeds, thereby increasing the overall electrical efficiency for operating the vehicle.

2. A vehicle according to claim 1, wherein said first means for reversibly stopping the rotation of one of the first and second rotational members while permitting said first and second drive shafts to continue rotating is a brake and a freewheel/clutch assembly.

3. A vehicle according to claim 1, wherein said automatic activation of said first stopping means results from programming in said controller that minimizes the usage of power during the operation of the vehicle.

4. A vehicle according to claim 1, further comprising a rotational buffering means associated with at least one of said first and second drive shafts, wherein said rotational buffering means absorbs torsional stresses generated by acceleration and deceleration.

5. A vehicle according to claim 4, wherein said rotational buffering means comprises a resilient member that absorbs said torsional stresses.

6. A vehicle according to claim 4, wherein said rotational buffering means comprises a coiled spring member that absorbs said torsional stresses.

7. A vehicle according to claim 1, further comprising a second stopping means that creates a third vehicle speed range when activated by reversibly stopping the rotation of said first and second rotational members not reversibly stopped by said first stopping means and said first and second drive shaft coupling means contain different gear ratios, wherein said second reversibly stopping means permits said first and second drive shafts to continue rotating and is a brake and a freewheel/clutch assembly.

8. A vehicle that utilizes a CR electric motor that automatically switches between a high efficiency CR motor mode of operation at lower vehicle speeds to a less efficiency traditional motor mode of operation at higher vehicle speeds to generate at least a portion of its propulsive force, comprising:
   (a) the vehicle having two front wheels and two rear wheels;
   (b) a CR motor mounted to the vehicle, wherein said CR motor comprises:
      (i) a first rotational member rotating in a first rotational direction about a central axis;
      (ii) a second rotational member rotating in a second rotational direction about said central axis;
      (iii) a first drive shaft attached to and extending from said first rotational member and rotating in said first rotational direction;
      (iv) a second drive shaft attached to and extending from said second rotational member and rotating in said second rotational direction;
      (v) at least one set of electromagnets associated with one of said first and second rotational members; and
      (vi) electrical input means for powering and controlling said set of electromagnets;
   (c) a first means for coupling said first drive shaft to said front wheels;
   (d) a second means for coupling said second drive shaft to said rear wheels;
   (e) means for matching said first drive shaft rotational direction with said second drive shaft rotational direction to produce a common rotational direction for said front and rear wheels;
   (f) means for reversibly stopping the rotation of one of said first and second rotational members while permitting said first and second drive shafts to rotate wherein said first means for reversibly stopping the rotation of one of the first and second rotational members while permitting said first and second drive shafts to continue rotating is a brake and a freewheel/clutch assembly;
   (g) a power source linked to said CR motor for providing electricity; and
   (h) a programmable controller in communication with said CR motor and said stopping means that controls both the speed of the vehicle and said stopping means to switch between a first operational mode in which both rotational members are rotating for slower vehicle speeds and a second operational mode in which one of said rotational members is stopped by said stopping means, thereby creating a traditional electric motor for higher vehicle speeds, thereby increasing the overall electrical efficiency for operating the vehicle, wherein said programmable controller utilizes an improved efficiency profile that relates vehicle range versus vehicle speed and when switching from CR motor operation to traditional operation is appropriate for increased vehicle operational efficiency.

9. A vehicle according to claim 8, wherein said automatic activation of said stopping means results from programming in said controller that minimizes the usage of power during the operation of the vehicle.

10. A vehicle according to claim 8, wherein said first means for coupling said first drive shaft to said front wheels comprises a differential gear box and said second means for coupling said second drive shaft to said rear wheels comprises a differential gear box oriented to reverse the rotation of said second shaft to produce a common rotational direction for both front and rear wheels.

11. A vehicle according to claim 8, further comprising a rotational buffering means associated with at least one of said first and second drive shafts, wherein said rotational buffering means absorbs torsional stresses generated by acceleration and deceleration.

12. A vehicle according to claim 11, wherein said rotational buffering means comprises a resilient member that absorbs said torsional stresses.

13. A vehicle according to claim 11, wherein said rotational buffering means comprises a coiled spring member that absorbs said torsional stresses.

14. A vehicle according to claim 8, further comprising a second stopping means that creates a third vehicle speed range when activated by reversibly stopping the rotation of said first and second rotational members not reversibly stopped by said first stopping means and said first and second drive shaft coupling means contain different gear ratios, wherein said second reversibly stopping means permits said first and second drive shafts to continue rotating and is a brake and a freewheel/clutch assembly.

* * * * *